(12) United States Patent
Takada et al.

(10) Patent No.: US 7,073,825 B2
(45) Date of Patent: Jul. 11, 2006

(54) ONE-OPERATION PIPING-INSTALLATION FLUID PRESSURE APPARATUS

(75) Inventors: Hideyuki Takada, Tsukuba-gun (JP); Bunya Hayashi, Tsukuba-gun (JP); Yukihiro Matarai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 19 days.

(21) Appl. No.: 10/387,468

(22) Filed: Mar. 14, 2003

(65) Prior Publication Data

US 2003/0193187 A1    Oct. 16, 2003

(30) Foreign Application Priority Data

Apr. 10, 2002 (JP) ............................ 2002-108323
Sep. 13, 2002 (JP) ............................ 2002-268925

(51) Int. Cl.
*F16L 39/00* (2006.01)
(52) U.S. Cl. ................. 285/124.1; 285/26; 285/124.5; 137/884
(58) Field of Classification Search ................ 285/26, 285/29, 120.1, 124.1, 124.2, 124.3, 124.4, 285/124.5; 137/597, 884
See application file for complete search history.

(56) References Cited

U.S. PATENT DOCUMENTS

| 4,089,549 | A | * | 5/1978 | Vyse et al. ............... 285/124.4 |
| 5,201,552 | A | * | 4/1993 | Hohmann et al. ........ 285/124.4 |
| 5,271,646 | A | * | 12/1993 | Allread et al. ............ 285/124.2 |
| 5,699,834 | A | * | 12/1997 | Hayashi et al. ............. 137/884 |
| 5,725,255 | A | * | 3/1998 | Hayashi et al. ............... 285/26 |
| 5,855,229 | A | * | 1/1999 | Gluf, Jr. ..................... 137/884 |
| 5,944,056 | A | * | 8/1999 | Miyazoe et al. ........ 137/625.64 |
| 6,164,335 | A | * | 12/2000 | Hayashi et al. ............. 137/884 |
| 6,170,527 | B1 | * | 1/2001 | Hayashi et al. ............. 137/884 |
| 6,173,745 | B1 | * | 1/2001 | Hayashi et al. ............. 137/884 |
| 6,206,045 | B1 | * | 3/2001 | Hayashi et al. ............. 137/884 |
| 6,237,634 | B1 | * | 5/2001 | Narita et al. ............ 137/625.27 |
| 2002/0163187 | A1 | * | 11/2002 | Pelfrey et al. ............ 285/124.1 |

* cited by examiner

*Primary Examiner*—James M. Hewitt
(74) *Attorney, Agent, or Firm*—Oblon, Spivak, McClelland, Maier & Neustadt, P.C.

(57) ABSTRACT

A fluid pressure apparatus is formed of a fluid pressure device including a plurality of ports opening in rows on its one end face and a pipe joint assembly in which a plurality of quick-type pipe joints are retained by a joint holder in the same arrangement as the respective ports of the fluid pressure device, in rows. Pipes from respective actuators are connected to the respective pipe joints in advance. After the actuators and the fluid pressure device are installed, the respective pipe joints of the pipe joint assembly are inserted into the corresponding ports of the fluid pressure device to thereby connect the pipes to the respective ports of the fluid pressure device by one operation.

18 Claims, 16 Drawing Sheets

ONE-OPERATION PIPING-INSTALLATION FLUID PRESSURE APPARATUS

TECHNICAL FIELD

The present invention relates to a one-operation piping-installation fluid pressure apparatus by which pipes can be easily connected to a plurality of ports by one operation.

PRIOR ART

In driving an actuator such as an air cylinder by a solenoid valve, for example, the solenoid valve and the actuator need to be connected through a pipe. In driving a plurality of actuators, because a plurality of solenoid valves corresponding to the actuators are used, the number of pipes increases as well as a matter of course. In order to connect the solenoid valves and the actuators through the pipes, the solenoid valves and the actuators are normally fixed to their predetermined places and then, pipe joints are mounted to their ports to connect the pipes. In such a method, however, operations from mounting of the pipe joints to connection of the pipes have to be carried out one by one, separately, and in turn. Therefore, the number of man-hours increases and the operations are seriously burdensome.

On the other hand, when the plurality of solenoid valves are used as described above, in order to facilitate handling and management of the solenoid valves, the solenoid valves are grouped together into a solenoid valve assembly by being coupled to each other and the respective solenoid valves and the corresponding actuators are connected through the pipes in many cases. Although such a case has an advantage in that the pipes can be connected to the respective solenoid valves intensively at one place, the number of man-hours required to connect the pipes is not reduced and therefore, the connecting operations are not simplified. On the contrary, there is another problem of an increased likelihood of improper connection of the pipes because the plurality of solenoid valves is disposed close to each other. Moreover, because a large number of pipe joints have to be individually fixed to the fluid pressure device by clips, such operations are seriously burdensome and clips are likely to get lost.

Such problems occur not only in the above-described case in which the plurality of solenoid valves are grouped together and used as described above but in a case in which the pipes are connected to the normal fluid pressure device having the plurality of ports.

DISCLOSURE OF THE INVENTION

It is a technical object of the present invention to carry out connecting operations for connecting pipes to respective ports of a fluid pressure device having a plurality of ports easily by one operation and accurately without causing improper connection.

It is another technical object of the invention to easily connect and fix pipe joints to the plurality of ports and to prevent clips used for the fixing from getting lost.

To achieve the above objects, according to the invention, there is provided a one-operation piping-installation fluid pressure apparatus comprising: a fluid pressure device including a plurality of ports open on one end face in a row; a pipe joint assembly including a plurality of pipe joints each having a port connecting portion capable of being connected to the port by insertion and a pipe connecting hole to which a pipe can be detachably connected, the pipe joints being retained by a joint holder, in a row, and in the same arrangement as the plurality of corresponding ports with the port connecting portions projecting from a back face of the holder and with the pipe connecting holes exposed on a front face side of the holder; and a fixing mechanism for fixing the pipe joint assembly to the fluid pressure device in a connected state.

Because the present invention has the above structure, the pipes from respective actuators such as air cylinders are previously connected to the respective pipe joints of the pipe joint assembly, the actuators and the fluid pressure device are disposed at predetermined places, and then the respective pipe joints of the pipe joint assembly are connected to the respective ports of the fluid pressure device. In this manner, the pipes from the respective actuators can be connected by one operation to the respective ports of the fluid pressure device. As a result, a connecting operation of the plurality of pipes can be carried out easily by one operation and accurately without causing an improper connection.

According to a structural form of the invention, the fluid pressure device is a solenoid valve assembly. The solenoid valve assembly includes a plurality of divided manifold blocks each having a solenoid valve on an upper face of the manifold block and two side blocks disposed on opposite sides of a row of the manifold blocks, at least one of the two side blocks also functioning as an air supply/exhaust block. The ports formed in the respective blocks form upper and lower two port rows parallel to each other. The pipe joint assembly includes upper and lower two rows of pipe joints parallel to each other.

According to a structural form of the invention, the pipe joint has the port connecting portion formed on a base end side of a cylindrical drum portion, the pipe connecting hole formed on a tip end side of the drum portion, and a plate locking groove provided to an outer periphery of the drum portion. The joint holder has a retaining plate having one or more retaining holes in which the pipe joints are fitted and a plurality of fixing plates to be simultaneously engaged with the plate locking grooves of the plurality of pipe joints fitted in the retaining holes to fix the pipe joints.

In this case, the retaining plate in the joint holder has two retaining holes in shapes of elongated holes parallel to each other and the plurality of pipe joints are housed in a row in each of the retaining holes. The plurality of fixing plates are formed of a first fixing plate to be engaged with the plate locking grooves of the respective pipe joints positioned in one of the pipe joint rows, a second fixing plate to be engaged with the plate locking grooves of the respective pipe joints positioned in the other pipe joint row, and a third fixing plate to be simultaneously engaged with the plate locking grooves of the respective pipe joints positioned in both pipe joint rows between the two pipe joint rows.

According to another structural form of the invention, the joint holder has a plurality of retaining plates each retaining the upper and lower two pipe joints and disposed in a row, a first fixing plate to be engaged with the plate locking grooves of the respective pipe joints positioned in the upper pipe joint row to fix the pipe joints, and a second fixing plate to be engaged with the plate locking grooves of the respective pipe joints positioned in the lower pipe joint row to fix the pipe joints positioned in the lower pipe joint row to fix the pipe joints.

According to a preferable structural form of the invention, the two side blocks also function as the air supply/exhaust blocks respectively, spaces between the air supply ports and the exhaust ports of the opposite side blocks are different from each other, and spaces between the pipe joints for the air supply ports and the pipe joints or sleeves for the exhaust ports mounted to left and right opposite sides of the pipe joint assembly are different from each other.

According to another structural form of the invention, the fixing mechanism for fixing the pipe joint assembly to the fluid pressure device includes one or more pairs of clip insertion holes provided at positions corresponding to at least a part of ports of the fluid pressure device to pass opposite end portions in a diametrical direction of the ports, clip locking grooves provided to outer peripheries of the port connecting portions of the pipe joints, and one or more elastic clips having first and second locking arms engaged with the clip locking grooves when inserted into the clip insertion holes.

In this case, it is preferable that the fixing mechanism has a rail-shaped clip holder for retaining the respective elastic clips such that each the clip can move between a fixed position and an unfixed position and that the clip holder can be attached to and detached from the fluid pressure device.

In the invention, it is preferable that the clip holder has clip retaining holes into which the elastic clips can be movably inserted at positions corresponding to the respective elastic clips, that each the elastic clip has projections at positions close to tip end portions of the first and second locking arms, and that the projections are locked to the clip holder when each the elastic clip is moved to the unfixed position where the elastic clip is detached from the clip locking grooves of the pipe joints so as to retain the elastic clip in the position.

By forming the fixing mechanism as described above, the pipe joints can be easily connected and fixed to the plurality of ports and it is possible to prevent the clips used for fixing from getting lost.

BRIEF DESCRIPTION OF THE INVENTION

DETAILED DESCRIPTION

Figure 1:
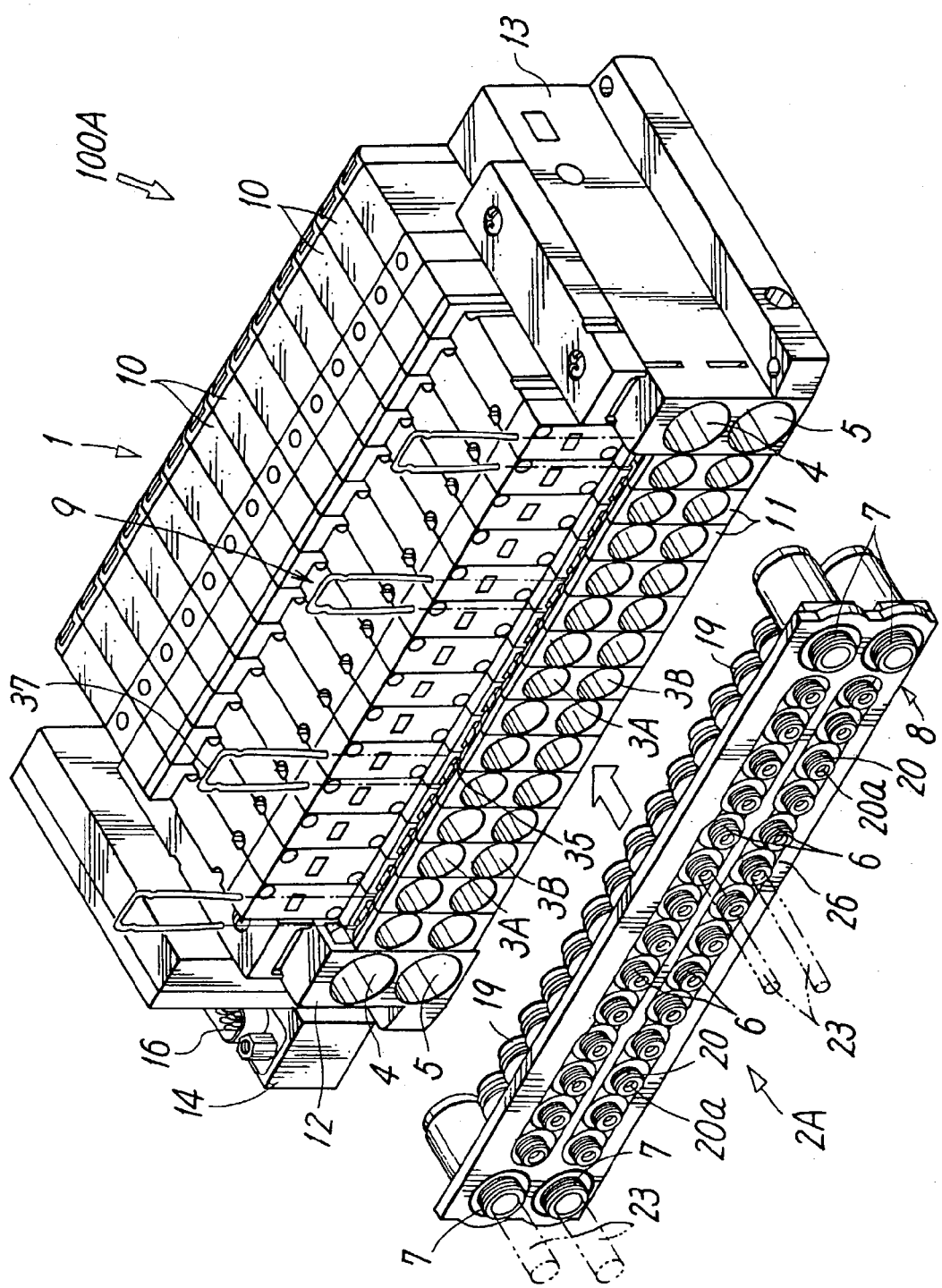
FIG. 1 is a perspective view of a first embodiment of a fluid pressure apparatus according to the present invention with a pipe joint assembly detached.

FIG. 1 shows a first embodiment of a one-operation piping-installation fluid pressure apparatus according to the present invention. The fluid apparatus 100A includes a fluid pressure device 1 having a plurality of ports 3A, 3B, 4, and 5 which are provided in a concentrated configuration and open in rows on one end face of the apparatus 100A and to which pipes are connected, a pipe joint assembly 2A formed by retaining a plurality of quick-type pipe joints 6 and 7 in a concentrated configuration and in rows on a set of joint holder 8, and a fixing mechanism 9 for fixing the pipe joint assembly 2A to the fluid pressure device 1 in a connected state.

The fluid pressure device 1 is in a form of a solenoid valve assembly in which a plurality of solenoid valves 10 and associated members are coupled together. In other words, the respective solenoid valves 10 are individually mounted onto divided manifold blocks 11. By joining the manifold blocks 11 in a lateral width direction and integrally coupling the manifold blocks 11, two side blocks 12 and 13 disposed on opposite sides of a row of manifold blocks, and a feeding block 14 disposed outside the one side block 12 with a tie rod or the like, the solenoid valves 10 are grouped together.

The respective manifold blocks 11 have the same forms as each other. First and second two output ports 3A and 3B individually communicating with the mounted solenoid valve 10 only are provided at vertically-opposed positions of a front end face of each the manifold block 11. By coupling the manifold blocks 11 to each other, the output ports 3A and 3B are disposed a concentrated configuration and in rows on the front end face of the fluid pressure device 1. In an example shown in the drawings, a port row formed of the first output ports 3A and a port row formed of the second output ports 3B are disposed in upper and lower two layers and are parallel to each other.

Both the two side blocks 12 and 13 also function as air supply/exhaust blocks. In a front end face of each of the side blocks 12 and 13, the air supply port 4 and the exhaust port 5 are open in vertically opposed positions. The air supply ports 4 communicate with common air supply flow paths extending through the respective manifold blocks 11 and communicating with each other. The exhaust ports 5 similarly communicate with common exhaust flow paths extending through the respective manifold blocks 11 and communicating with each other. Diameters of each the air supply port 4 and each the exhaust port 5 are the same as each other but are larger than diameters of the output ports 3A and 3B of the manifold block 11. The air supply ports 4, the exhaust ports 5, and the respective output ports 3A and 3B are disposed in upper and lower two rows as a whole and are vertically and bilaterally symmetric.

On the other hand, the feeding block 14 is provided with an electric connector 16 communicating with the respective solenoid valves 10 and a conductive wire from a controller is connected to the electric connector 16 through an electric connector mounted to a tip end of the wire.

Art for grouping the plurality of solenoid valves 10 together to from the solenoid valve assembly as described above is known already and structures of the embodiment other than those described above are substantially similar to the known structures and are not directly related to the gist of the invention. Therefore, any more detailed description of them is omitted here.

Figure 2:
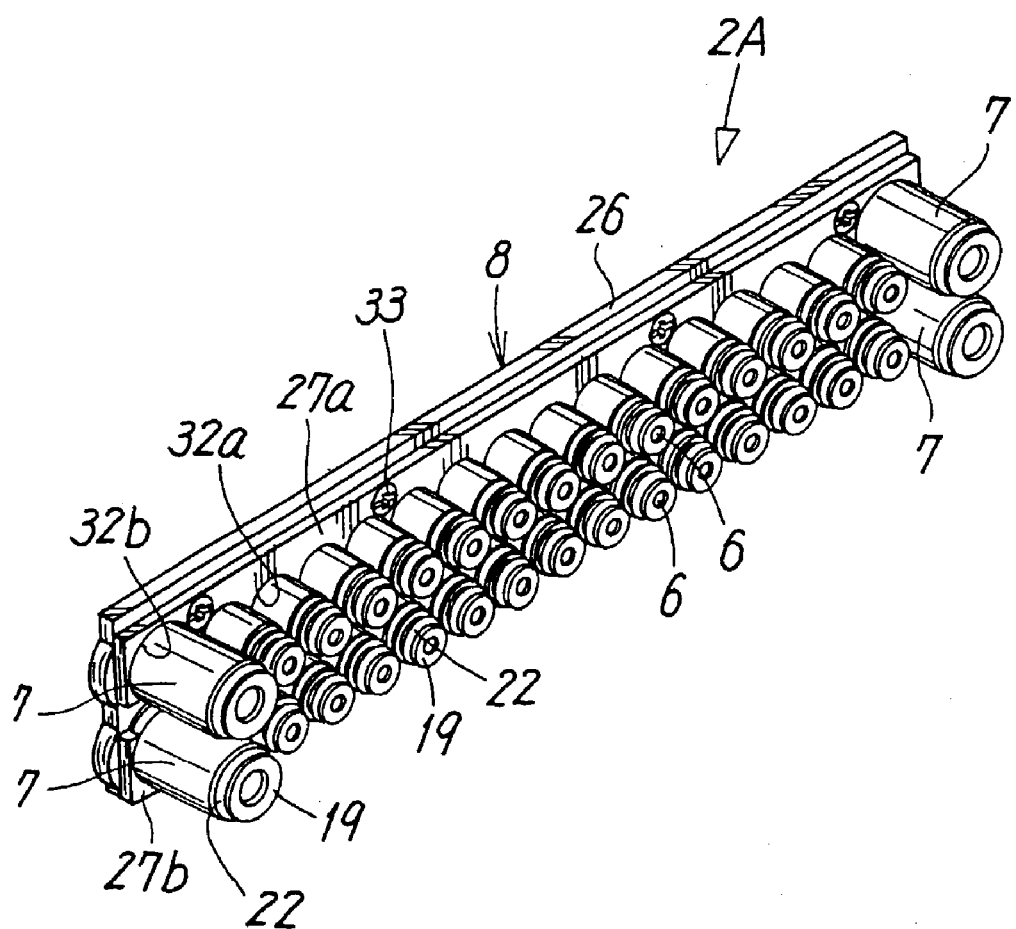
FIG. 2 is a perspective view of the pipe joint assembly viewed from an opposite side to FIG. 1.
Figure 3:
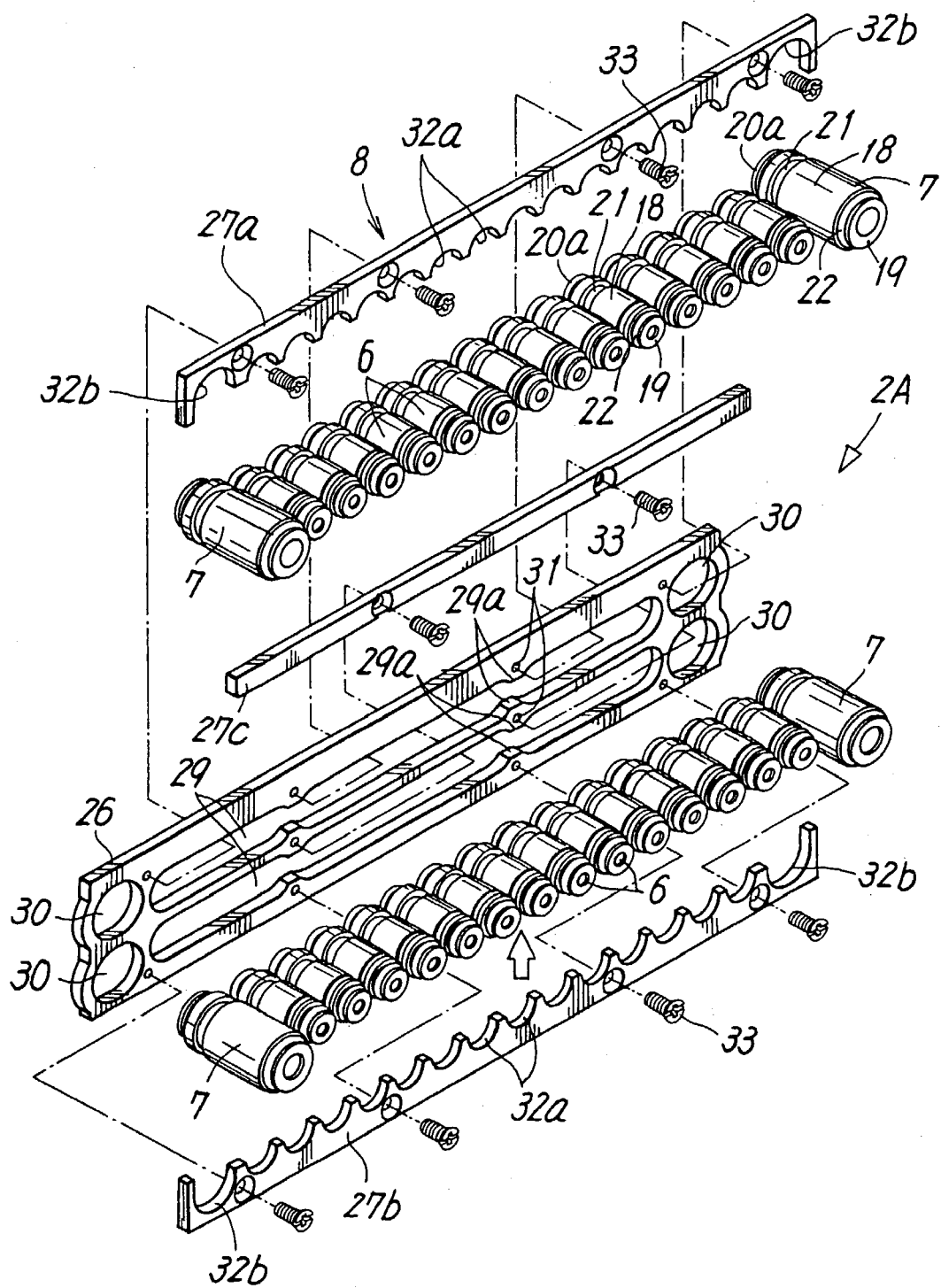
FIG. 3 is an exploded perspective view of the pipe joint assembly.

On the other hand, as is clear from FIGS. 2 and 3, the pipe joint assembly 2A is formed by retaining the plurality of pipe joints 6 and 7 which can be attached to and detached from the respective ports 3A, 3B, 4, and 5 of the fluid pressure device 1 on the set of joint holder 8 in similar arrangements to the respective ports 3A, 3B, 4, and 5.

Figure 4:
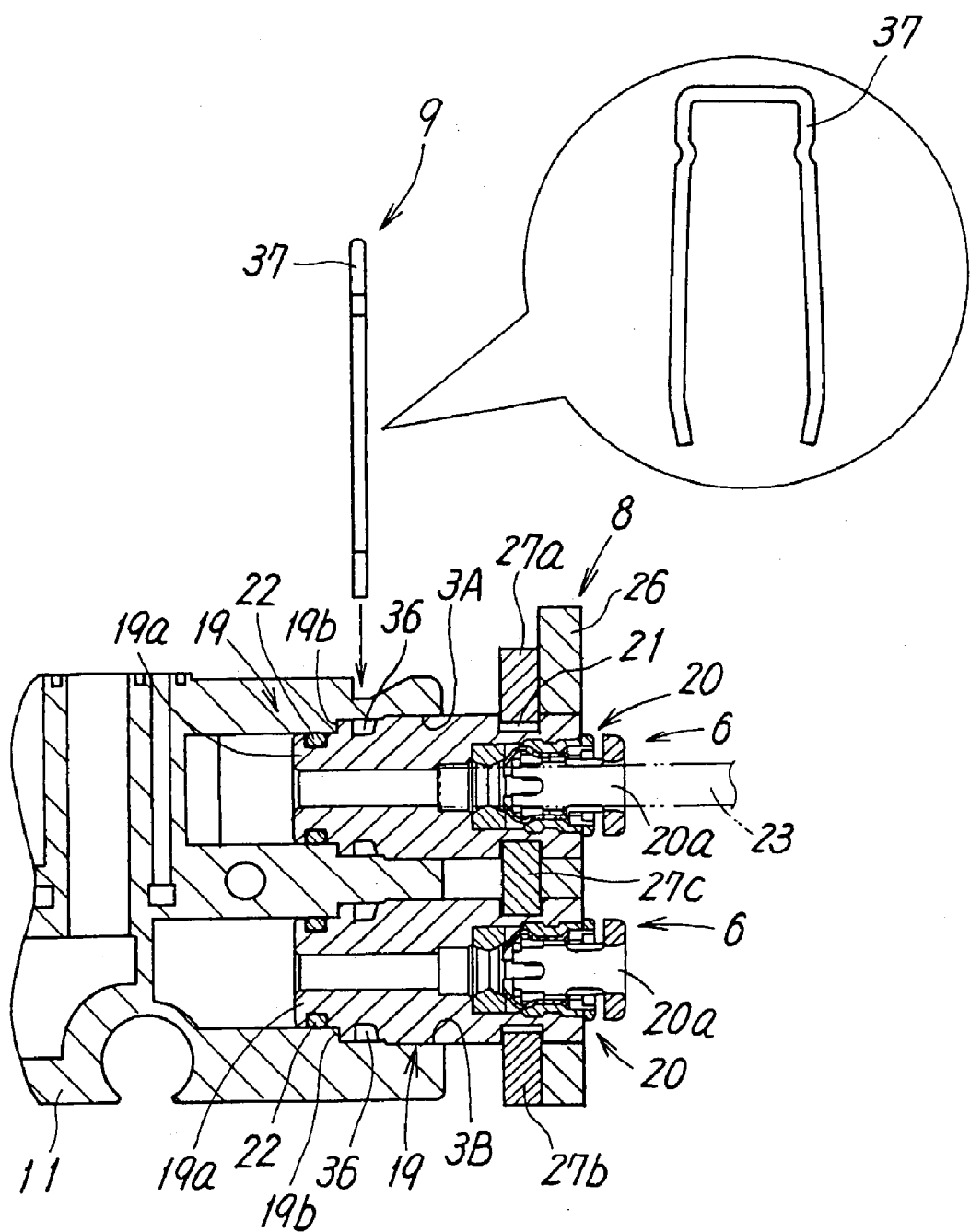
FIG. 4 is a sectional view of an essential portion of the pipe joint assembly connected to a fluid pressure device.
Figure 5:
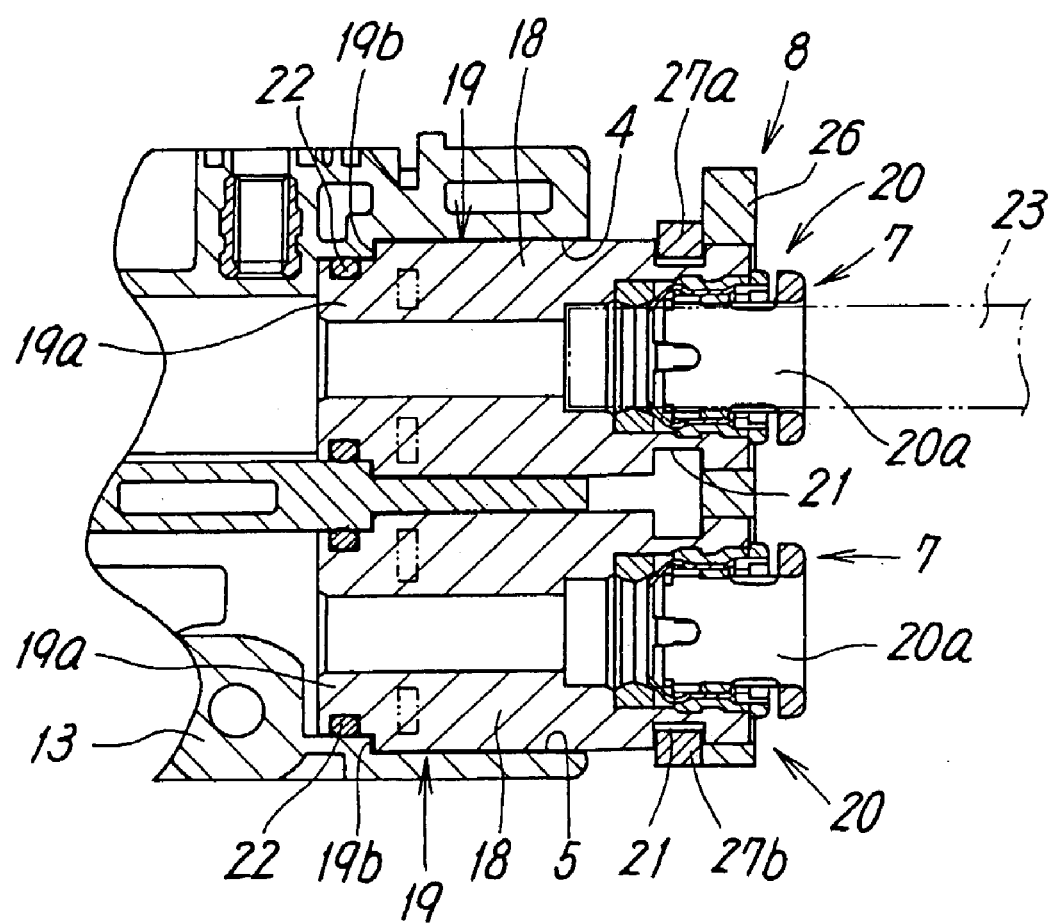
FIG. 5 is a sectional view of another essential portion of the pipe joint assembly connected to the fluid pressure device.

Out of the pipe joints 6 and 7, the pipe joints 6, 6 to be connected to the output ports 3A and 3B of the manifold blocks 11 are formed to have small diameters because diameters of the output ports 3A and 3B are small. The pipe joints 7, 7 to be connected to the air supply ports 4 and the exhaust ports 5 of the side blocks 12 and 13 are formed to have large diameters because diameters of the ports 4 and 5 are large. However, structures of the pipe joints 6, 6 and the pipe joints 7, 7 are substantially similar to each other. In other words, as is clear from FIGS. 4 and 5, each of the pipe joints 6 and 7 includes a cylindrical drum portion 18, a port connecting portion 19 formed on a base end side of the drum portion 18, a pipe connecting portion 20 formed on a tip end side of the drum portion 18, and a plate locking groove 21 provided to an outer periphery of the drum portion 18.

An end portion of the port connecting portion 19 is formed into a small-diameter portion 19a. A sealing member 22 is provided to an outer periphery of the small-diameter portion 19a. By inserting the small-diameter portion 19a into each of the ports 3A, 3B, 4, and 5 through the sealing member 22, the port connecting portion 19 is connected to the port in a fluid-tight manner. At this time, a stepped portion 19b formed by the small-diameter portion 19a comes in contact with a stepped portion inside each of the ports 3A, 3B, 4, and 5 to thereby carry out positioning in connection. The pipe connecting portion 20 has at a tip end thereof a pipe connecting hole 20a. As a part of pipe joints are shown in the drawings as representatives, by inserting a tip end of a pipe 23 into the pipe connecting hole 20a, the pipe 23 can be connected while being prevented from coming out. Because such a connecting structure for connecting the pipe 23 in an inserting manner in the quick-type pipe joint is known already, any more specific description of it will be omitted. As the pipe 23, a flexible tube made of synthetic resin is used, for example.

As is clear from FIG. 3, the joint holder 8 is formed of one retaining plate 26 and first to third three fixing plates 27a, 27b, and 27c. The retaining plate 26 has such a length as to be astride all the ports 3A, 3B, 4, and 5 on the end face of the fluid pressure device 1, includes two joint retaining holes 29, 29 in shapes of elongated holes extending in a longitudinal direction at a central portion of the retaining plate 26 and two joint retaining holes 30, 30 in shapes of single holes at each end portion of the retaining plate 26, and is formed in a vertically symmetric and bilaterally symmetric shape as a whole. Here, "the shape of the elongated hole" refers to the shape of such a size as to be fitted over a plurality of pipe joints in a row and "the shape of the single hole" refers to the shape of such a size as to be fitted over only one pipe joint.

The two retaining holes 29, 29 in the shapes of the elongated holes are provided in parallel in the vertical direction. In the one retaining hole 29 at an upper position, all the pipe joints 6 to be connected to the first output ports 3A are fitted at positions close to the tip ends of the drum portions 18. In the other retaining hole 29 at the lower position, all the pipe joints 6 to be connected to the second output ports 3B are similarly fitted. At a plurality of positions of the respective retaining holes 29, 29, projections 29a, 29a projecting inside the retaining holes 29 to be locked to the pipe joints 6 are formed at opposed positions of walls of both the holes. The projections 29a, 29a partition the retaining holes 29 into a plurality of hole portions and the plurality of pipe joints 6 are respectively retained in each the hole portion while being prevented from moving to other hole portions. In portions provided with large member widths by formation of the projections 29a, 29a, screw holes 31 used for screwing the fixing plate are formed respectively. The projections 29a, 29a may be formed in such positions as to be locked to the respective pipe joints.

On the other hand, the retaining holes 30, 30 in the shapes of the single holes have circular or oval shapes, formed respectively at upper and lower opposed positions of opposite end portions of the retaining plate 26, and the large-diameter pipe joints 7 to be connected to the air supply ports 4 and the exhaust ports 5 are individually fitted in the retaining holes 30 at positions close to the tip ends of the drum portions 18.

Out of the tree fixing plates 27a, 27b, and 27c, the first fixing plate 27a is engaged from an upper side of the row of the pipe joints with plate locking grooves 21 of the pipe joints 6 and 7 respectively fitted in the retaining hole 29 in the shape of the elongated hole and the retaining holes 30 in the shapes of the single holes positioned on the upper side of the retaining plate 26 to thereby fix the pipe joints 6 and 7. The first fixing plate 27a has a plurality of recessed portions 32a and 32b in which the respective pipe joints 6 and 7 are fitted at a lower edge of the plate 27a. At positions of the recessed portions 32a and 32b, the first fixing plate 27a is engaged with the plate locking grooves 21 and is fixed to the screw holes 31 of the retaining plate 26 by screws 33 in this state.

The second fixing plate 27b is engaged from a lower side of the row of the pipe joints with the plate locking grooves 21 of the pipe joints 6 and 7 fitted in the retaining hole 29 in the shape of the elongated hole and the retaining holes 30 in the shapes of the single holes positioned on the upper side of the retaining plate 26 to thereby fix the pipe joints 6 and 7. The second fixing plate 27b has a plurality of arc-shaped recessed portions 32a and 32b in which the respective pipe joints 6 and 7 are fitted at an upper edge of the plate 27b. At positions of the recessed portions 32a and 32b, the second fixing plate 27b is engaged with the plate locking grooves 21 and is fixed to the screw holes 31 of the retaining plate 26 by screws 33 in this state. These first fixing plate 27a and the second fixing plate 27b have bilaterally symmetric shapes which are similar to each other and the same plate can be used both as the first fixing plate 27a and the second fixing plate 27b by turning it upside down.

The third fixing plate 27c is positioned between the upper and lower two rows of pipe joints 6, 6 fitted in the two retaining holes 29, 29 in the shapes of the elongated holes. Upper and lower opposite edges of the third fixing plate 27c are simultaneously engaged with the plate locking grooves 21 of the respective pipe joints 6, 6 of both the pipe joint rows to fix the pipe joints 6, 6. In this state, the third fixing plate 27c is fixed to the screw holes 31 of the retaining plate 26 by screws 33. Therefore, the upper and lower pipe joint 6, 6 fitted in the retaining holes 29, 29 in the shapes of the elongated holes are fixed while being sandwiched between the third fixing plate 27c, the first fixing plate 27a, and the second fixing plate 27b respectively from upper and lower opposite sides. On the other hand, because the third fixing plate 27c does not reach the pipe joints 7, 7, the pipe joints 7, 7 fitted in the retaining holes 30, 30 in the shapes of the single holes are fixed by the first fixing plate 27a and the second fixing plate 27b respectively from one sides. Because the upper and lower opposite edges of the third fixing plate 27c are not formed with the recessed portions 32a unlike the first and second fixing plates 27a and 27b, the upper and lower opposite edges have linear shapes. However, the similar recessed portions may be formed if necessary.

Thus, the respective pipe joints 6 and 7 are retained in a concentrated manner, in rows, and in similar arrangements to the respective ports 3A, 3B, 4, and 5 of the fluid pressure device 1 by the joint holder 8 with the port connecting portions 19 projecting from a back face of the joint holder 8 and the connecting holes 20a for the pipes 23 exposed on a front face. The pipe joint assembly 2A is formed into a bilaterally symmetric shape as a whole and can also be used when it is turned in a lateral direction.

The pipe joint assembly 2A is mounted to the fluid pressure device 1 by inserting the port connecting portions 19 of the respective pipe joints 6 and 7 into the corresponding ports 3A, 3B, 4, and 5 of the fluid pressure device 1. At this time, the pipe joint assembly 2A is fixed in the mounted state by the fixing mechanisms 9.

The fixing mechanism 9 is formed of a pair of clip insertion holes 35, 35 provided to each of the one or more manifold blocks 11 forming the fluid pressure device 1 to vertically pass parts of opposite end portions in diametrical direction of the upper and lower two ports 3A and 3B from an upper face of the manifold block 11, clip locking grooves 36 provided to outer peripheries of the port connecting portions 19 of the respective pipe joints 6 and 7, and a U-shaped elastic clip 37. By inserting a pair of locking arms 37a, 37a of the elastic clip 37 into the clip insertion holes 35, 35, the clip 37 is locked to the clip locking grooves 36 to thereby fix the pipe joints 6 and 7. Although the fixing mechanism 9 is preferably provided at such an interval as to fix every three or fourth pipe joint 6, the fixing mechanism 9 may be provided to fix every pipe joint 6. It is also possible that the clip insertion holes 35 and the clips 37 are also provided to the side blocks 12 and 13 to fix the pipe joints 7.

Because the fluid pressure apparatus 100A has the above-described structure, the pipes 23 from respective actuators such as air cylinders are previously connected to the respective pipe joints 6 and 7 of the pipe joint assembly 2A, the actuators and the fluid pressure device 1 are disposed at predetermined positions, and then the port connecting portions 19 of the respective pipe joints 6 and 7 of the pipe joint assembly 2A are inserted into the corresponding ports of the fluid pressure device 1 and are fixed in connected states by the clips 37. In this manner, the pipes 23 from the respective actuators can be connected by one operation to the respective ports 3A, 3B, 4, and 5 of the fluid pressure device 1. As a result, a connecting operation of the plurality of pipes 23 can be carried out easily by one operation and accurately without an improper connection.

Figure 6:
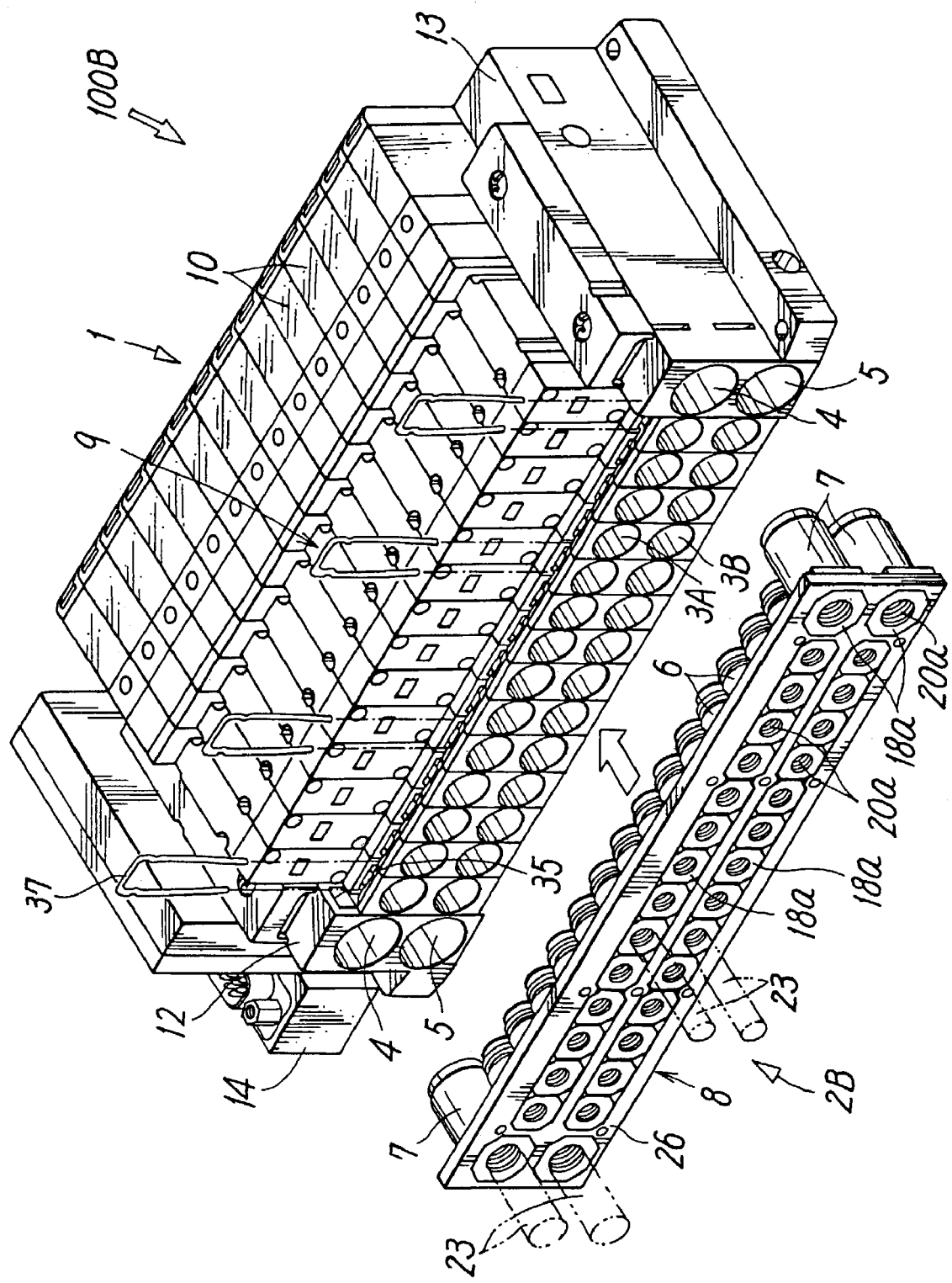
FIG. 6 is a perspective view of a second embodiment of the fluid pressure apparatus according to the invention with a pipe joint assembly detached.
Figure 7:
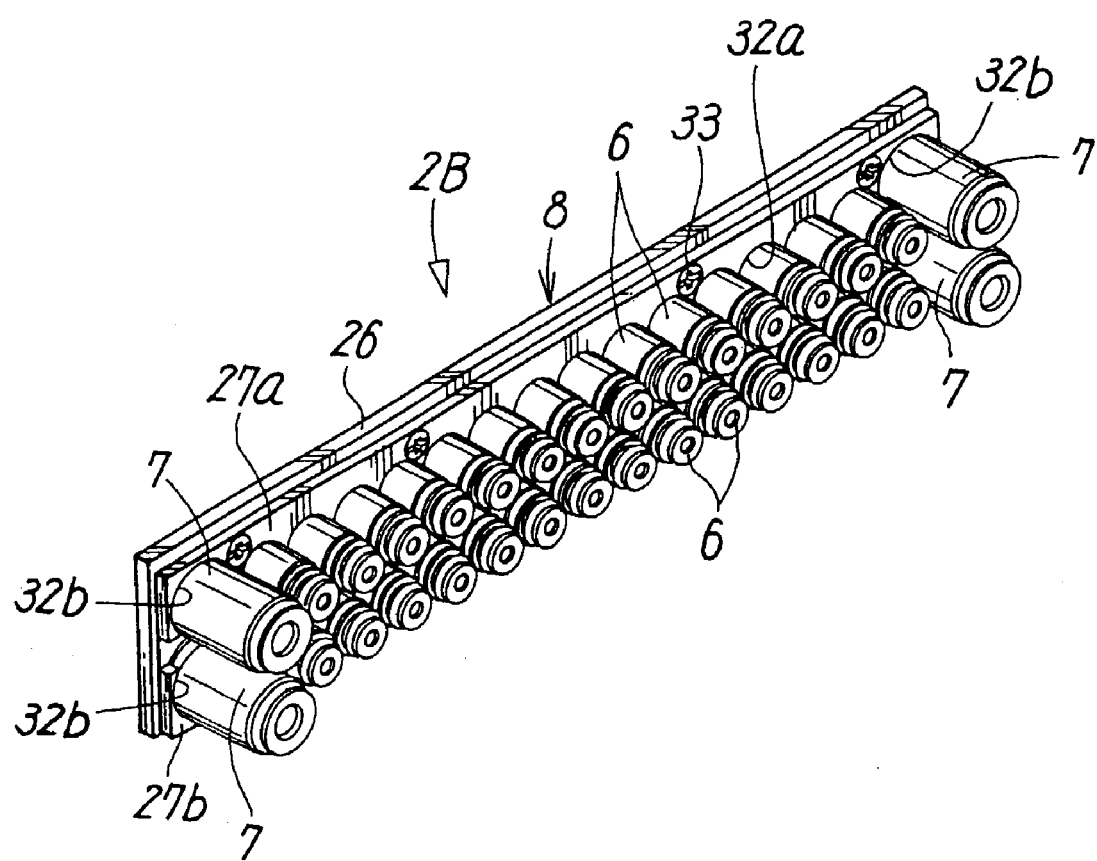
FIG. 7 is a perspective view of the pipe joint assembly viewed from an opposite side to FIG. 6.
Figure 8:
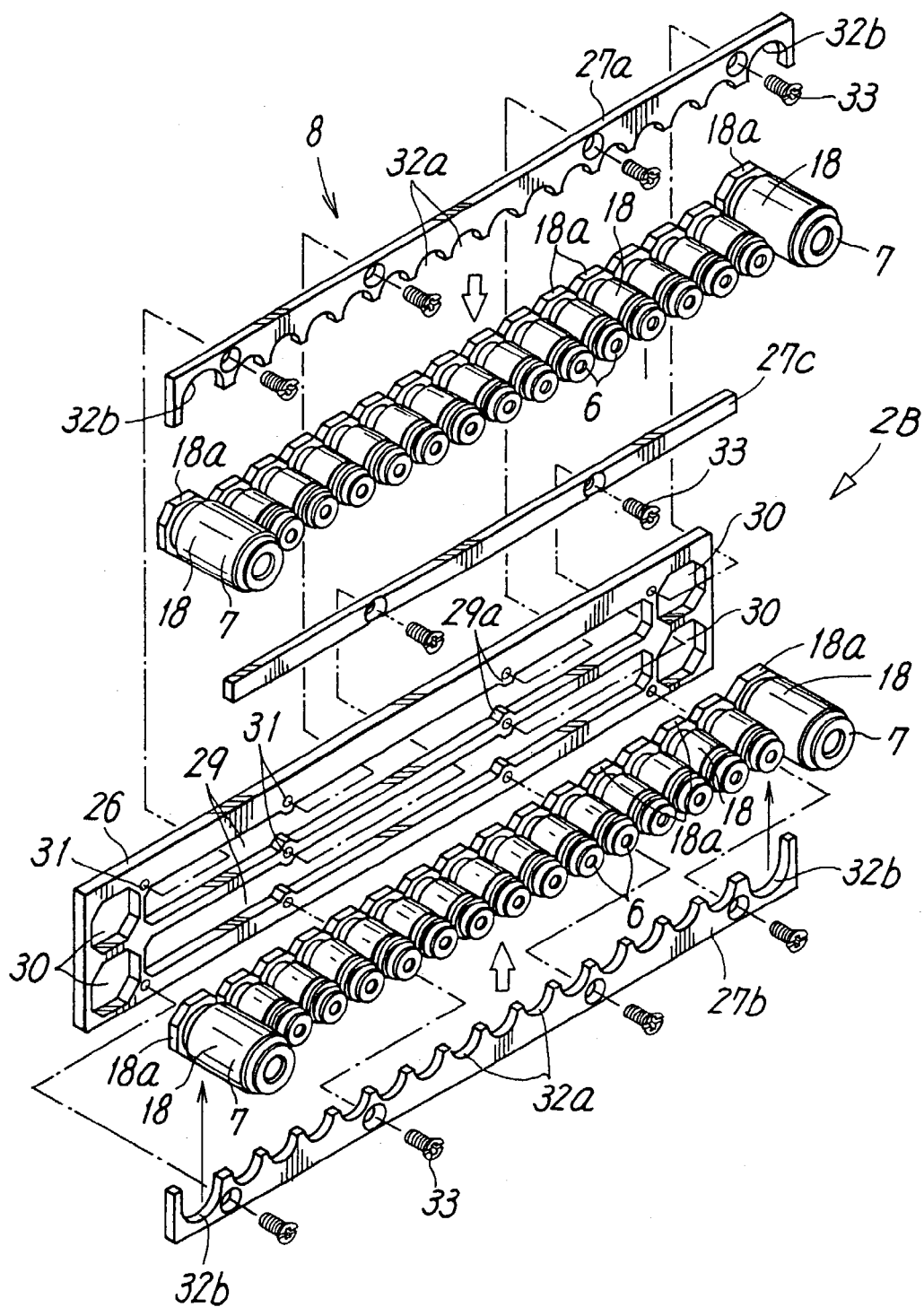
FIG. 8 is an exploded perspective view of the pipe joint assembly.

FIG. 6 shows a second embodiment of the fluid pressure apparatus. A structure of a pipe joint assembly 2B of a fluid pressure apparatus 100B of the second embodiment is slightly different from that of the pipe joint assembly 2A of the first embodiment. In other words, in the pipe joint assembly 2B, s can be understood from FIGS. 7 and 8, portions 18a at tip ends of the drum portions 18 of the respective pipe joints 6 and 7 to be fitted in the joint retaining holes 29 and 30 are formed in polygonal shapes and opposite end portions and portions formed with the projections 29a of the retaining holes 29 in the shapes of the elongated holes are formed in angular shapes to adapt to the polygonal shapes such that the pipe joints 6 can neatly come in contact with the retaining holes 29. The retaining holes 30 in the shapes of the single holes are also formed in the shapes of angular holes. The pipe connecting holes 20a of the respective pipe joints 6 and 7 are formed as screw holes such that the pipes 23 can be connected to the pipe connecting holes 20a by screwing.

The tip end portions 18a of the drum portions 18 of the pipe joints 6 and 7 may be formed in various shapes such as rectangular shapes, e.g., a square and a rectangle, an irregular octagon formed by cutting off corners of the rectangular shape, and a regular hexagon. By forming the respective joints 6 and 7 and the retaining holes 29 and 30 in such shapes, it is possible to prevent rotation of the pipe joints 6 and 7 in screwing the pipes 23 down into the pipe connecting holes 20a to easily carry out the connecting operation. There is also an advantage in that assembly of the pipe joint assembly 2B and a change of a broken pipe joint can be carried out easily because the respective pipe joints 6 and 7 do not turn unnecessarily in the retaining holes 29 and 30.

However, the pipe connecting hole 20a of each of the respective pipe joints 6 and 7 may be one to which the pipe is connected by insertion like the pipe joint in the above first embodiment. Conversely, the pipe joint of the first embodiment may be of a screwing type.

Because the structures of the second embodiment other than those described above are substantially similar to those of the first embodiment, main similar components are provided with reference numerals similar to those of the first embodiment to omit description of the components.

Although the retaining plate 26 has the retaining holes 29 in the shapes of the elongated holes and the plurality of pipe joints 6 are arranged in rows in the retaining holes 29 in the first and second embodiments, a plurality of retaining holes in the shapes of the single holes in each of which only one pipe joint can be fitted may be arranged in rows instead of the above-described retaining holes 29 in the shapes of the elongated holes if an interval between the ports 3A, 3A adjacent to each other of the fluid pressure device 1 is relatively large, for example.

Figure 9:
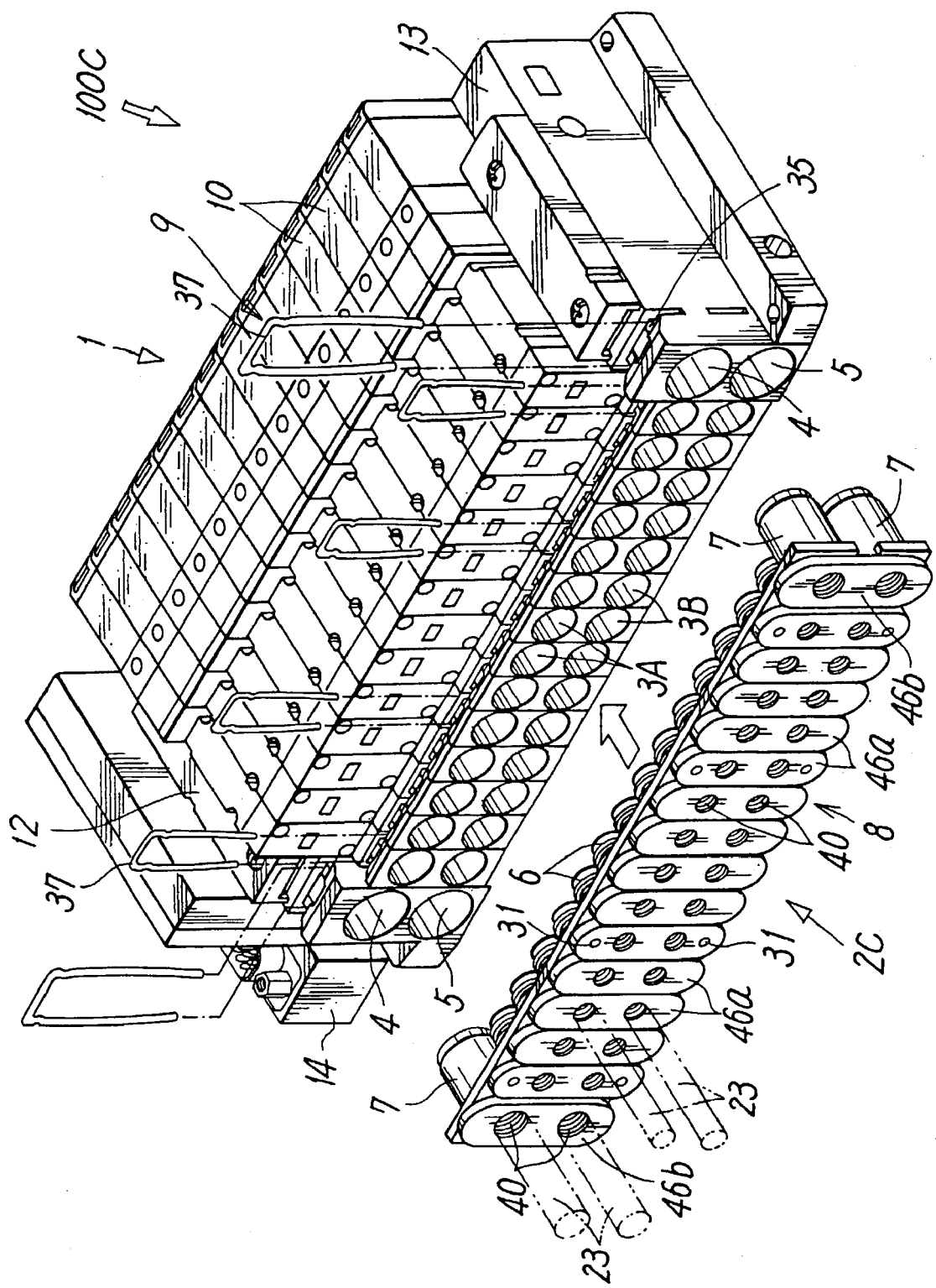
FIG. 9 is a perspective view of a third embodiment of the fluid pressure apparatus according to the invention with a pipe joint assembly detached.
Figure 10:
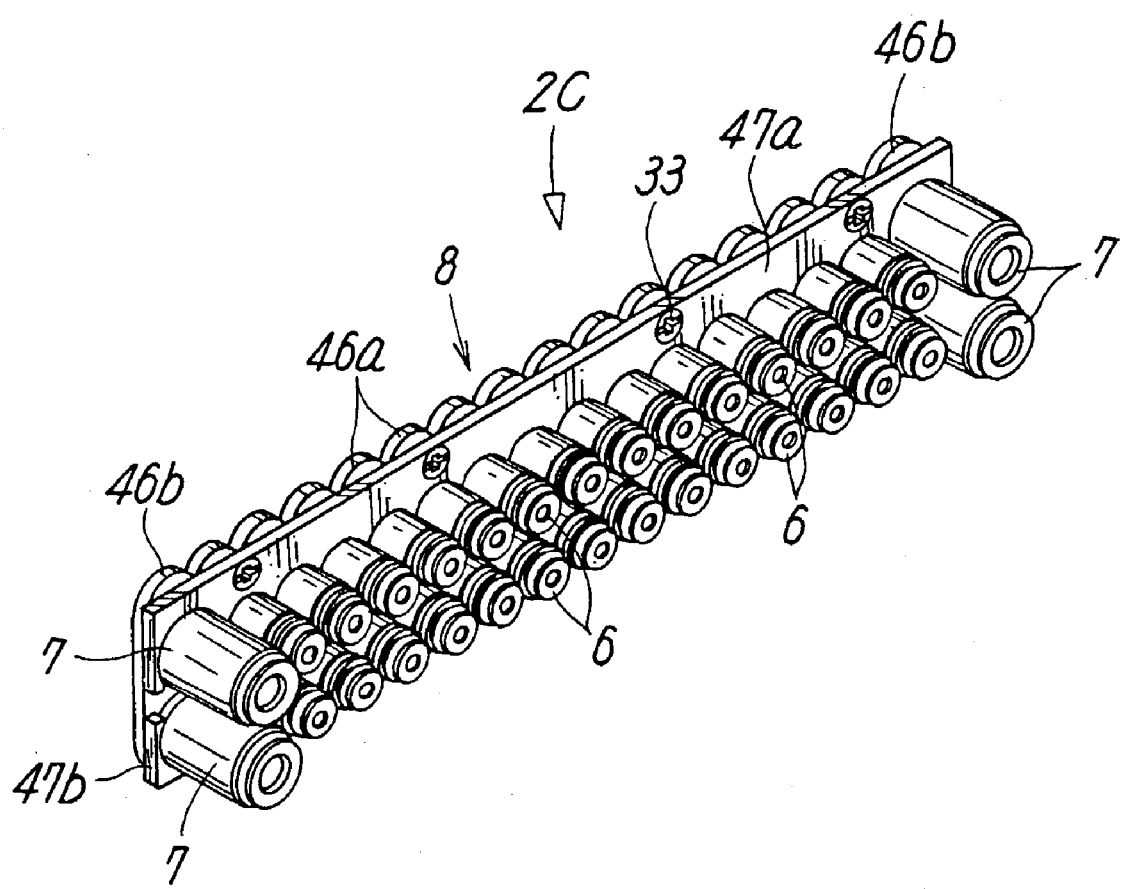
FIG. 10 is a perspective view of the pipe joint assembly viewed from an opposite side to FIG. 9.
Figure 11:
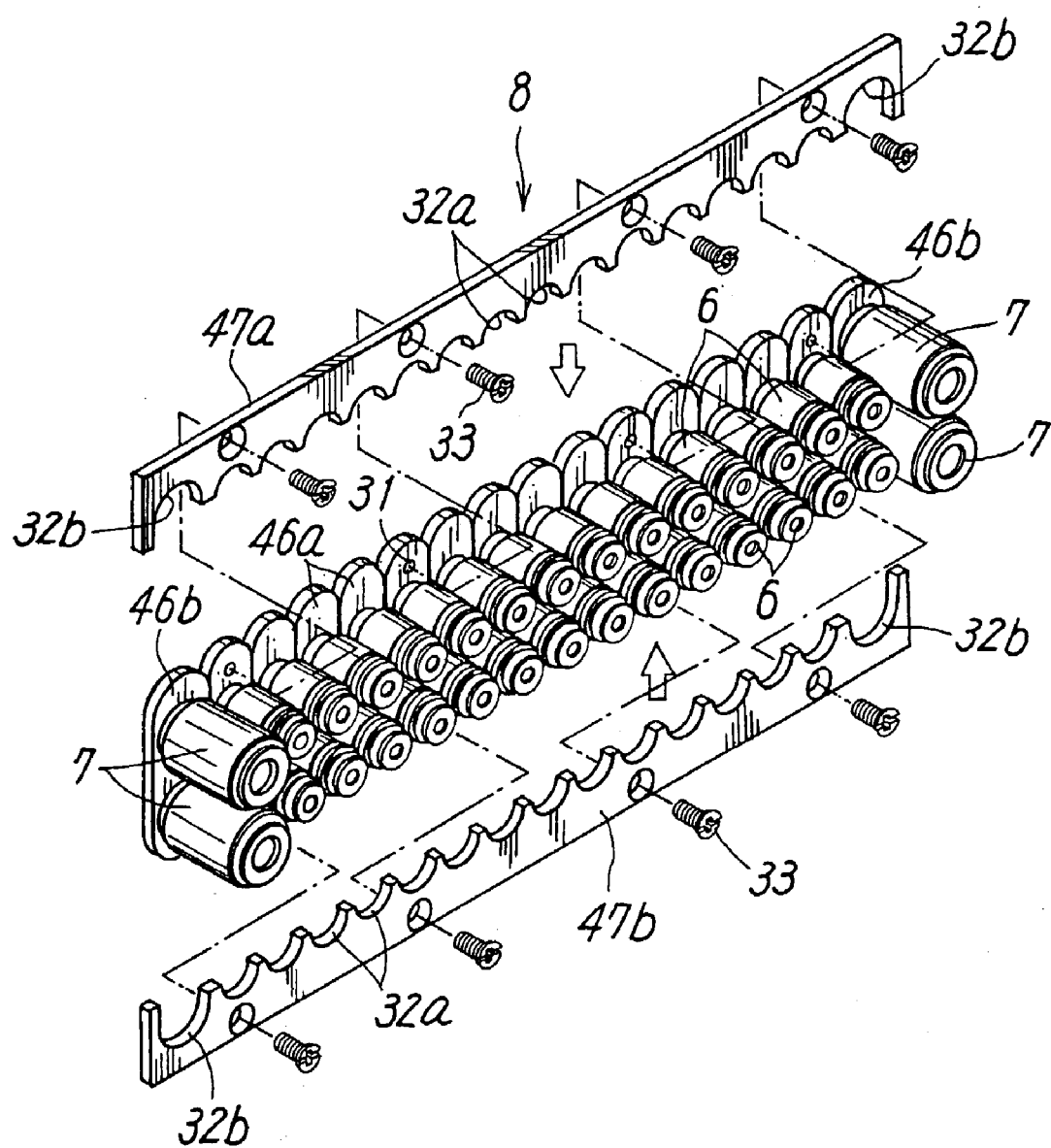
FIG. 11 is an exploded perspective view of the pipe joint assembly.

FIG. 9 shows a third embodiment of the fluid pressure apparatus. A structure of a pipe joint assembly 2C of a fluid pressure apparatus 100C of the third embodiment is different from those of the pipe joint assemblies 2A and 2B of the first and second embodiments. In other words, as can be clear from FIGS. 10 and 11, the joint holder 8 in the pipe joint assembly 2C is formed of a plurality of retaining plates 46a, 46b each for retaining an upper and lower pair of pipe joints 6, 6 or 7, 7 and two fixing plates 47a, 47b for fixing the pipe joints 6, 6, 7, 7 retained by the retaining plates 46a and 46b in rows.

The retaining plates 46a and 46b are formed to be of sizes corresponding to the two pipe joints 6, 6 or 7, 7 to retain. In other words, each of the retaining plates 46a and 46b is formed of a vertically long member having a lateral width slightly larger than a diameter of the pipe joints 6, 6 or 7, 7 and a vertical length larger than a distance between upper and lower ends of the two pipe joints 6, 6 or 7, 7. To openings 40, 40 provided to upper and lower positions of each of the retaining plates 46a and 46b, the two pipe joints 6, 6 or 7, 7 are fixedly mounted from a back side of the plate by screwing, fitting, or the like. Therefore, each the retaining plate 46a for retaining the small-diameter pipe joints 6, 6 to be connected to the upper and lower output ports 3A and 3B of the fluid pressure device 1 is slightly smaller than each the retaining plate 46b for retaining the large-diameter pipe joints 7, 7 to be connected to the air supply port 4 and the exhaust port 5. The required number of retaining plates 46a and 46b are prepared such that the total number of the pipe joints 6 and 7 in the pipe joint assembly 2C is the same as that of the ports 3A, 3B, 4, and 5 in the fluid pressure device 1 and the retaining plates 46a and 46b are arranged in a row to be close to each other. In this case, there is no need to connect the respective retaining plates 46a and 46b to each other.

On the other hand, the fixing plate is formed of a first fixing plate 47a to be simultaneously engaged with the plate locking grooves 21 of the respective pipe joints 6 and 7 in the upper pipe joint row from above and a second fixing plate 47b to be simultaneously engaged with the plate locking grooves 21 of the respective pipe joints 6 and 7 in the lower pipe joint row from below. A lower edge of the first fixing plate 47a and an upper edge of the second fixing plate 47b are respectively provided with a plurality of arc-shaped recessed portions 32a and 32b in which the respective pipe joints 6 and 7 are fitted. At positions of the recessed portions 32a and 32b, the first fixing plate 47a and the second fixing plate 47b are engaged with the plate locking grooves 21. By binding the respective pipe joints 6 and 7 by the fixing plates 47a and 47b from above and below and fixing both the fixing plates 47a and 47b to the screw holes 31 formed in some of the retaining plates 46a and 46b by the screws 33 in this state, the respective pipe joints 6 and 7 are fixed in a state of a group.

The openings 40, 40 formed in the respective retaining plates 46a and 46b are formed as screw holes communicating with the pipe connecting holes of the respective pipe joints 6 and 7 and the pipes can be connected to the openings 40, 40 by screwing. However, it is also possible that the openings 40, 40 are formed not into the screw holes but into the normal holes and that the pipe connecting holes of the pipe joints 6 and 7 are formed into the screw holes or the holes to which the pipes can be connected by insertion like the pipe joints in the first embodiment to connect the pipes to the connecting holes through the openings 40 and 40.

Because the structures of the third embodiment other than those described above are substantially similar to those of the first embodiment, main similar components are provided with reference numerals similar to those of the first embodiment to omit description of the components.

Figure 12:
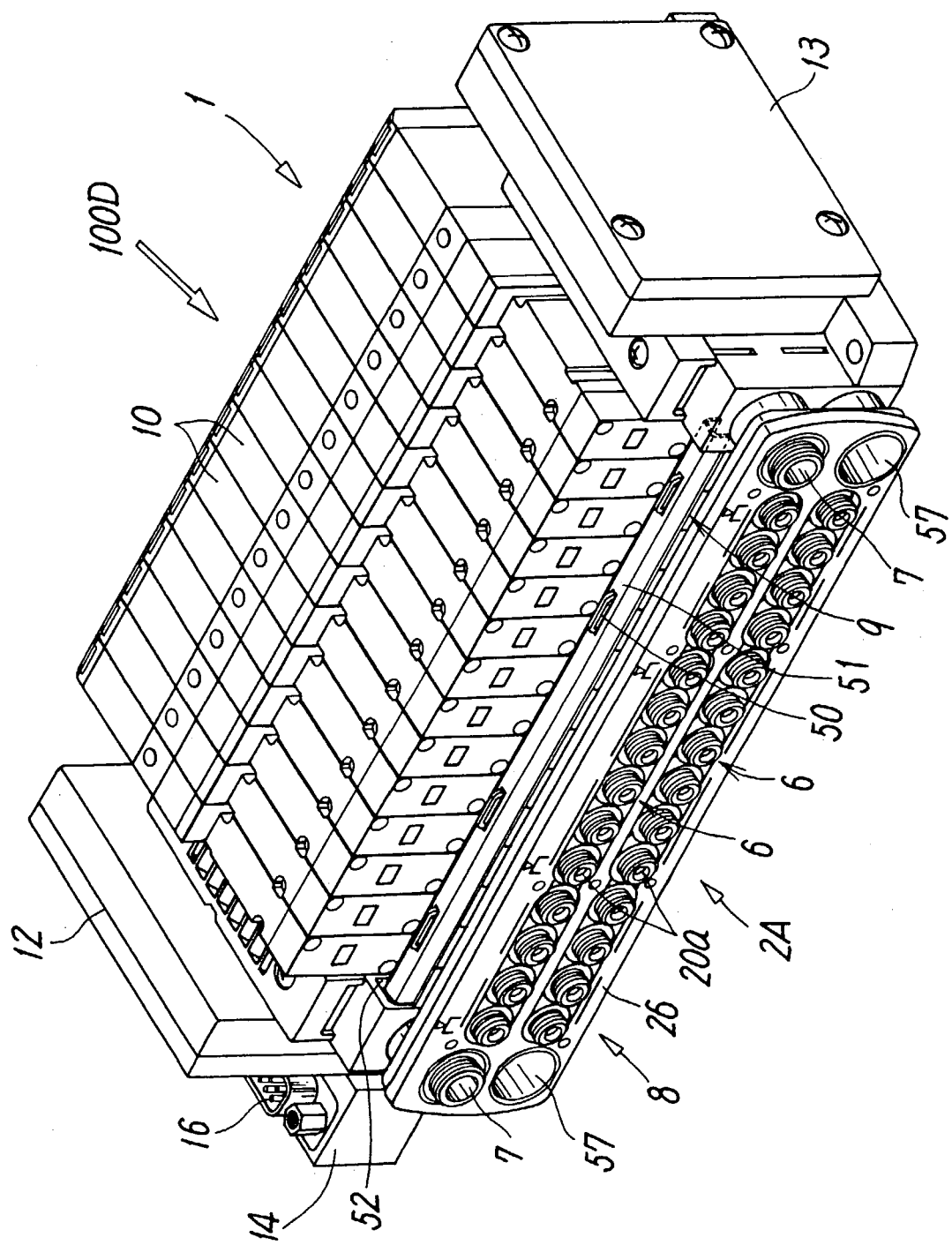
FIG. 12 is a perspective view of a fourth embodiment of the fluid pressure apparatus according to the invention.
Figure 13:
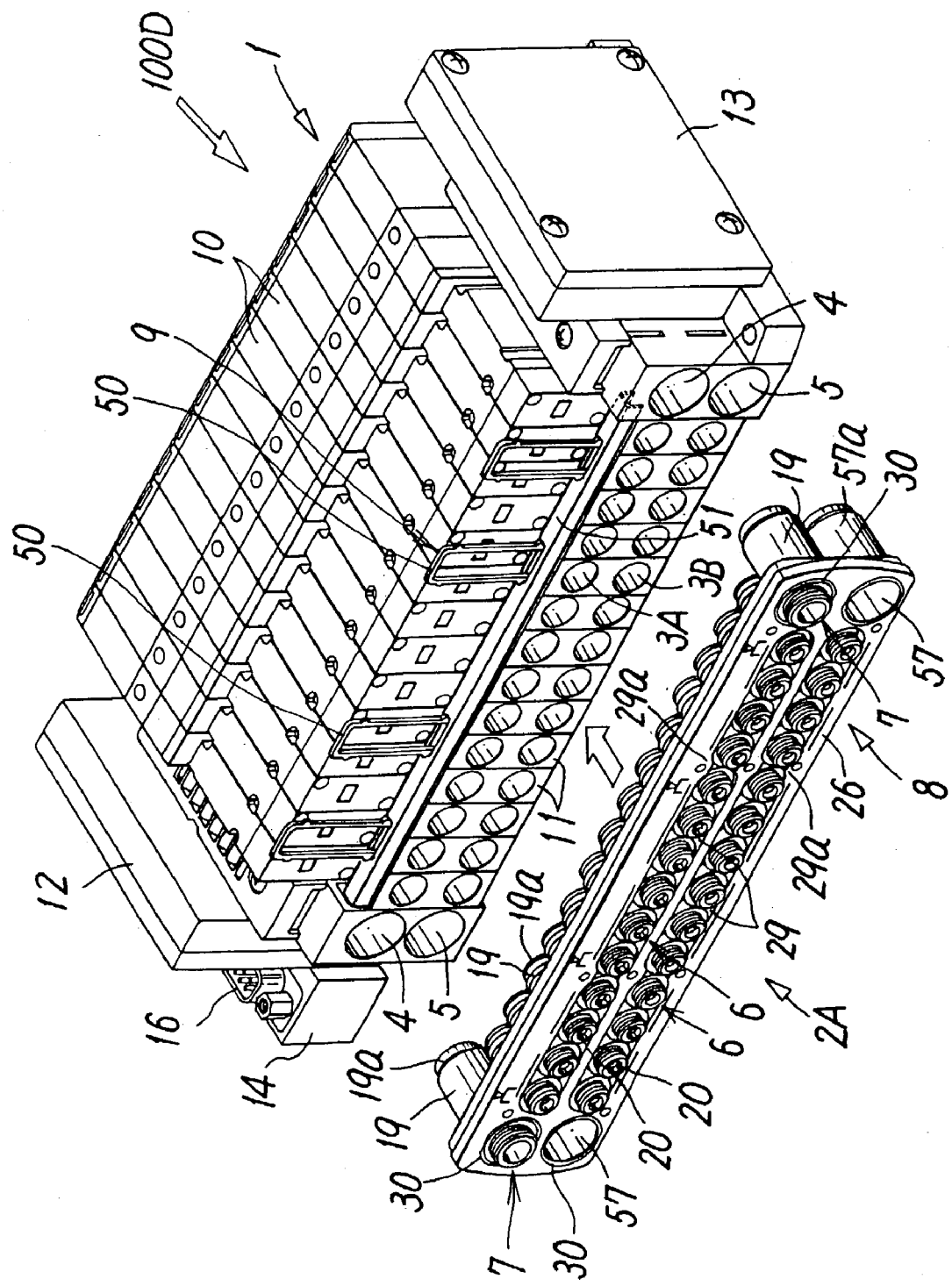
FIG. 13 is a perspective view of the pipe joint assembly in FIG. 12 with a pipe joint assembly detached from a fluid pressure device.
Figure 14:
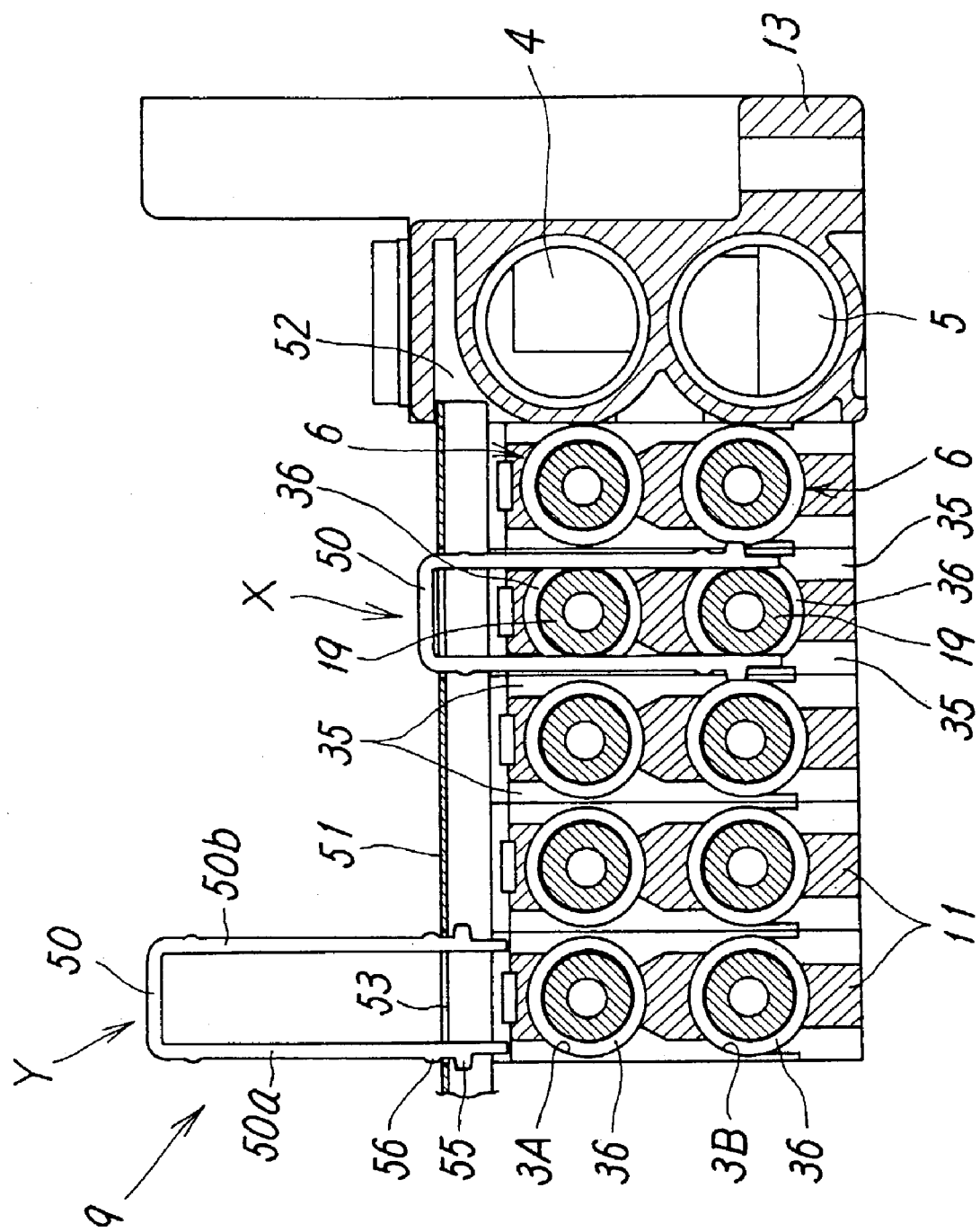
FIG. 14 is a partially enlarged sectional view of FIG. 12.
Figure 15:
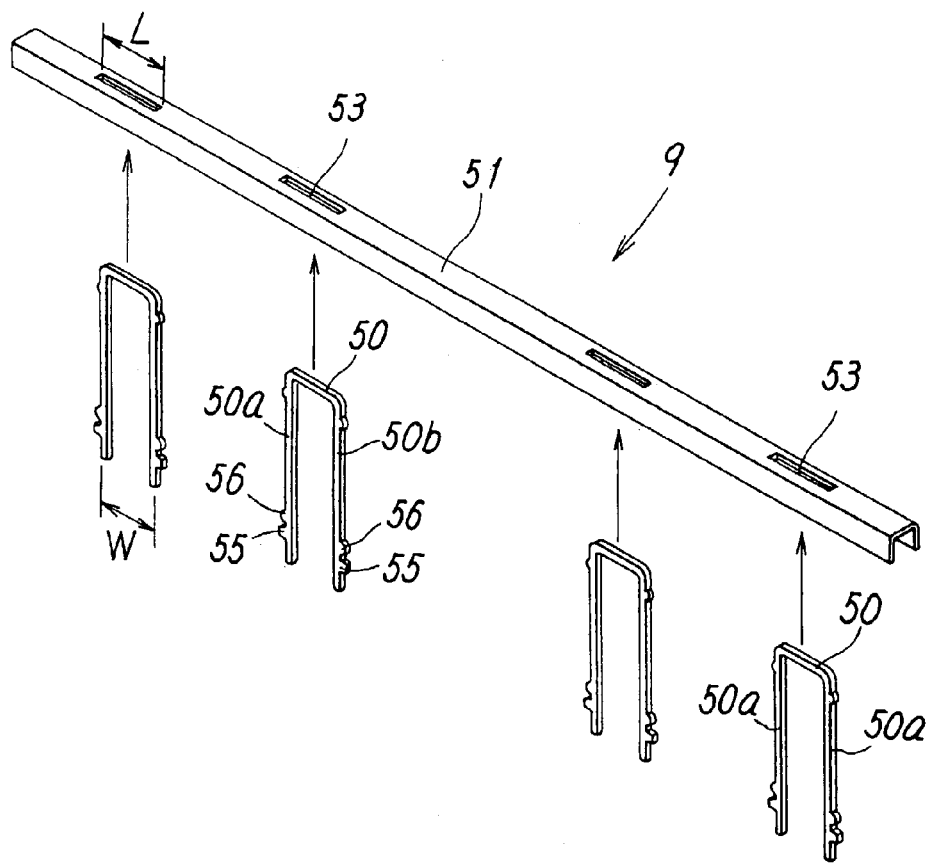
FIG. 15 is an exploded perspective view of elastic clips and a clip holder for fixing the pipe joint assembly.

FIGS. 12 and 13 show a fourth embodiment of the fluid pressure apparatus of the invention. A structure of the fixing mechanism 9 for fixing the pipe joint assembly 2A to the fluid pressure device 1 of a fluid pressure apparatus 100D is different from that of the first embodiment. In other words, as can be seen from FIGS. 14 to 16, the fixing mechanism 9 of the fourth embodiment is formed of substantially-U-shaped elastic clips 50 each having first and second two locking arms 50a and 50b, a rail-shaped clip holder 51 for retaining a plurality of elastic clips 50, pairs of clip insertion holes 35, 35 each provided to positions of each the manifold block 11 corresponding to the output ports 3A and 3B to pass the opposite end portions in diametrical direction of both the output ports 3A and 3B, and the clip locking grooves 36 provided to the port connecting portions 19 of the pipe joints 6. By inserting the locking arms 50a and 50b of each the elastic clip 50 into the clip insertion holes 35, 35, the locking arms 50a and 50b are engaged with the clip locking grooves 36, 36 of the upper and lower pipe joints 6, 6 and the pipe joints 6, 6 are fixed in a connected state to thereby fix the whole pipe joint assembly 2A to the fluid pressure device 1.

The clip holder 51 has a groove-shaped sectional shape and such a length as to be astride the left and right two side blocks 12 and 13 and is disposed at a position above the clip insertion holes 35, 35 to cross the respective manifold blocks 11. By locking opposite end portions of the clip holder 51 in recessed portions 52 of both the side blocks 12 and 13, the clip holder 51 is detachably mounted to the fluid pressure device 1. At positions of the clip holder 51 corresponding to the respective elastic clips 51, a plurality of slit-shaped clip retaining holes 53 in which the elastic clips 50 can be movably fitted and retained are provided. A length L of each the clip retaining hole 53 is slightly larger than a lateral width W of each the elastic clip 50.

The elastic clip 50 has a first projection 55 and a second projection 56 at positions of the two locking arms 50a and 50b near tip end portions thereof. When the elastic clip 50 is moved from a fixed position X where the locking arms 50a and 50b are engaged with the clip locking grooves 36 of the pipe joints 6 to an unfixed position Y where the locking arms 50a and 50b are unfixed from the clip locking grooves 36 in FIG. 14, both the projections 55 and 56 are locked to front and back opposite faces of the clip holder 51 to retain the elastic clip 50 at the position.

Out of both the projections, the first projections 55 positioned near the tip ends of the respective locking arms 50a and 50b are for preventing coming out and have larger heights than the second projections 56. When the elastic clip 50 is moved rearward to the unfixed position Y, the first projections 55 are locked to the back face of the clip holder 51 to stop the elastic clip 50 at the position. The other second projections 56 have smaller heights than the first projections 55 and are formed in round smooth shapes. When the elastic clip 50 is pushed into the fixed position X or is moved rearward to the unfixed position Y, the second projections 56 can pass a position of the clip retaining hole 53 by elastically deforming both the locking arms 50a and 50b. When the elastic clip 50 is released at the unfixed position Y, the second projections 56 are locked on the front face side of the clip holder 51 to stop the elastic clip 50 at the position.

Figure 16:
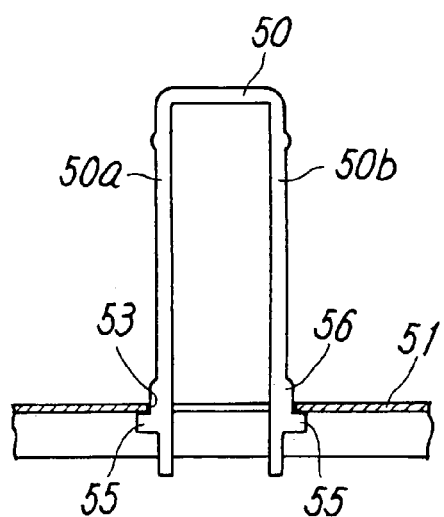
FIG. 16 is a front view of a variation of the elastic clip.

However, the whole second projection 56 may have a constant height as shown in FIG. 16. By forming the second projection 56 in such a shape, the second projection 56 elastically comes in contact with and is engaged with a hole edge of the clip retaining hole 53 to thereby stably retain the elastic clip 50 in the position.

Although the elastic clips 50 may be respectively provided to positions corresponding to all the manifold blocks 11, the elastic clips 50 are preferably provided at intervals of a plurality of manifold blocks 11 as in the embodiment shown in the drawings. As a result, it is possible to easily fix the pipe joint assembly 2A to the fluid pressure device 1 with fewer elastic clips 50 than the pipe joints 6 and 7.

With regard to the clip insertion holes 35, 35, the clip insertion hole 35 is provided to every manifold block 11 because the fluid pressure device 1 has the plurality of manifold blocks 11 having the same forms. However, the clip insertion holes 35, 35 may be selectively provided only at positions of the fluid pressure device 1 corresponding to the elastic clips 50.

In the fourth embodiment, the pipe joints 7 are fitted and retained only in the upper joint retaining holes 30 corresponding to the air supply ports 4 out of the joint retaining holes 30, 30 in the shapes of the single holes at opposite ends of the pipe joint assembly 2A, a cylindrical sleeve 57 is mounted to each of the lower joint retaining holes 30 corresponding to the exhaust ports 5, and the port connecting portion 19 of each the sleeve 57 is connected to the exhaust port 5. However, if the pipes need to be connected also to the exhaust ports 5, the pipe joints 7 are mounted also to the lower joint retaining holes 30.

Because the structures of the fourth embodiment other than those described above are substantially similar to those of the first embodiment, main similar components are provided with reference numerals similar to those of the first embodiment to omit description of the components.

Because the fluid pressure device 100D of the fourth embodiment has the above structure, from a state in which the pipe joint assembly 2A is detached as shown in FIG. 13, the port connecting portions 19, 19 of the respective pipe joints 6 and 7 and the sleeves 57 are inserted into the respective ports 3A, 3B, 4, and 5 of the fluid pressure device 1. Then, each the elastic clip 50 in the unfixed position Y is pushed down to insert the two locking arms 50a and 50b into the clip insertion holes 35, 35 on opposite sides of the pipe joints 6, 6. As a result, the elastic clip 50 is engaged with the clip locking grooves 36, 36 of the upper and lower pipe joints 6, 6 to fix the pipe joints 6, 6 in the connected states. Therefore, the pipe joint assembly 2A is fixed to the fluid pressure device 1 as shown in FIG. 12.

In order to detach the pipe joint assembly 2A from the fluid pressure device 1, each the elastic clip 50 in the fixed position X is lifted with fingers or a tool to move the clip 50 rearward to the unfixed position Y. Then, both the locking arms 50a and 50b of the elastic clip 50 are detached from the clip locking grooves 36, 36 of the upper and lower pipe joints 6, 6 to bring the pipe joints 6, 6 into the unfixed states. As a result, the pipe joint assembly 2A can be detached from the fluid pressure device 1 as shown in FIG. 13.

Here, because the elastic clip 50 is retained by the clip holder 51 mounted to the fluid pressure device 1 during attaching and detaching operations of the pipe joint assembly 2A, it is essential only that the clips 50 be moved between the fixed position X and the unfixed position Y Therefore, the operations are considerably easy and there is no fear of coming off and getting lost of each the elastic clip 50.

In order to detach the clip holder 51 from the fluid pressure device 1, one of the left and right side blocks 12 and 13 is unfixed and moved in such a direction as to increase a distance between the side blocks 12 and 13 or is detached. As a result, the clip holder 51 can be pulled out.

Although the pipe joint assembly 2A of the fourth embodiment is formed similarly to the pipe joint assembly 2A of the first embodiment, it is needless to say that the pipe joint assembly may be formed similarly to the pipe joint assemblies 2B and 2C of the second and third embodiments.

Figure 17:
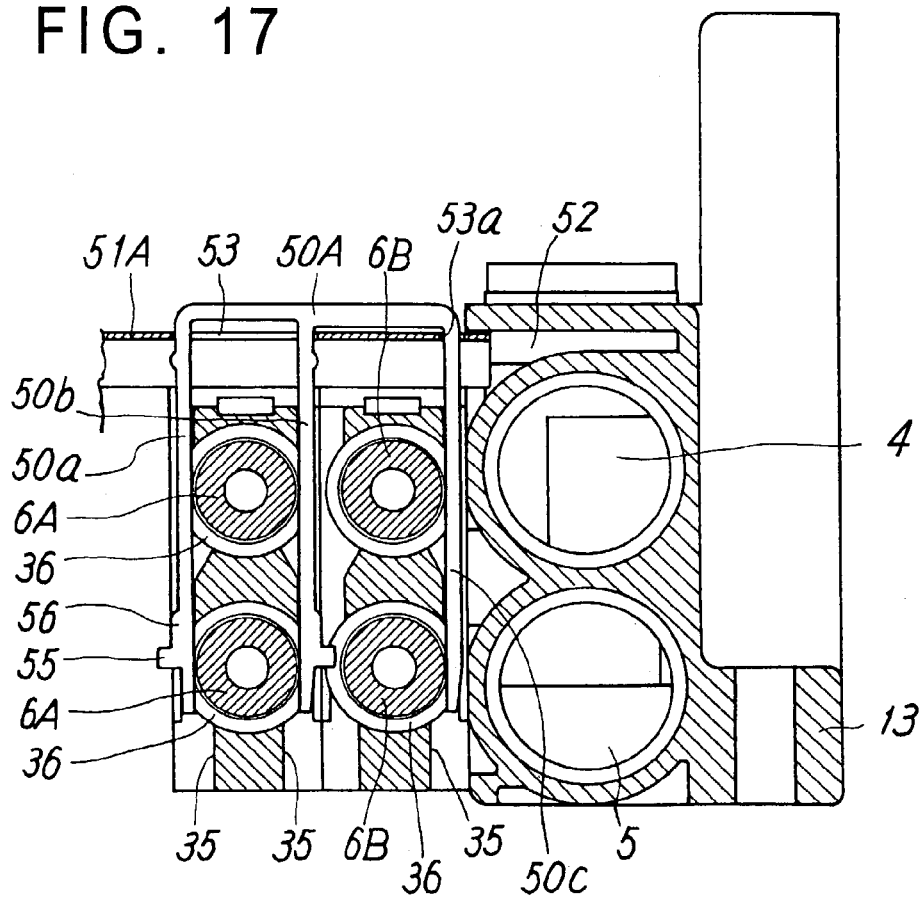
FIG. 17 is a sectional view of an essential portion of a variation of the fixing mechanism of the fourth embodiment.
Figure 18:
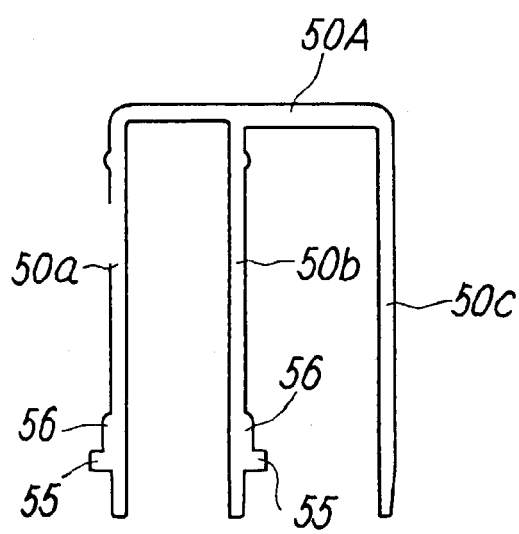
FIG. 18 is a front view of a variation of the elastic clip of FIG. 17.

FIG. 17 shows a variation of the fixing mechanism 9 in the fourth embodiment. In this variation, forms of the elastic clips and the clip holder are different from those of the fourth embodiment. In other words, as shown in FIG. 18, in addition to first and second two locking arms 50a and 50b, an elastic clip 50A has a third locking arm 50c extending parallel to the locking arms 50a and 50b. The third locking arm 50c is provided to a position on an opposite side of the second arm 50b to the first locking arm 50a and a space between the third locking arm 50c and the second locking arm 50b is slightly larger than a space between the first locking arm 50a and the second locking arm 50b. When the first and second locking arms 50a and 50b of the elastic clip 50A are inserted into the clip insertion holes 35, 35 on the opposite sides of pipe joints 6A and 6A, the third locking arm 50c is engaged with clip locking grooves 36 of pipe joints 6B, 6B adjacent to the pipe joints 6A, 6A from one side of the grooves 36.

A clip holder 51A for retaining the elastic clip 50A is provide with clip retaining holes 53a in which the third locking arms 50c are fitted in addition to clip retaining holes 53 in which the first and second two locking arms 50a and 50b are fitted.

Because the structures and effects of this variation other than those described above are substantially similar to those of the fourth embodiment, main similar components are provided with reference numerals similar to those of the fourth embodiment to omit description of the components.

Although only the elastic clips 50 each having the two locking arms 50a and 50b are used in the fourth embodiment and only the elastic clips 50A each having the three locking arms 50a, 50b, and 50c are used in the above variation, it is also possible to use the two kinds of elastic clips 50 and 50A.

Although the pipes are connected to the pipe connecting holes 20, 20 of the respective pipe joints 6 and 7 by insertion in the fourth embodiment, the pipe joints may have such structures that the pipes are connected by screwing.

Although each of the two side blocks 12 and 13 disposed on the opposite sides of the row of manifold blocks 11 also functions as the air supply/exhaust block in the above respective embodiments, it is possible that only one of the side blocks also functions as the air supply/exhaust block. It is also possible that an air supply/exhaust block is formed separately from the side blocks 12 and 13 and is provided inside one of or each of the side blocks. In the fourth embodiment, if the air supply/exhaust blocks are respectively provided inside both the side blocks 12 and 13, the clip holder 51 is supported on the air supply/exhaust blocks. If one air supply/exhaust block is provided inside only one of the side blocks, the clip holder 51 is supported on the air supply/exhaust block and the opposite side block.

In the above respective embodiments, because the respective ports 3A, 3B, 4, and 5 of the fluid pressure device 1 and the respective pipe joints 6 and 7 or the sleeves 57 of the pipe joint assemblies 2A to 2C are disposed vertically symmetrically and bilaterally symmetrically, the pipe joint assemblies 2A to 2C can also be mounted upside down. However, if mounting of the pipe joint assemblies 2A to 2C in a reverse orientation may cause improper piping installation, it is desirable to respectively dispose the respective ports and the respective pipe joints asymmetrically. For example, spaces between the air supply ports 4 and the exhaust ports 5 of the two side blocks 12 and 13 may be different from each other and spaces between the pipe joint 7 for the air supply port and the pipe joint 7 or the sleeve 57 for the exhaust port positioned on each of left and right sides of the pipe joint assemblies 2A to 2C may be different from each other according to the space between the air supply port 4 and the exhaust port 5. It is also effective that the only one of the two side blocks 12 and 13 is provided with the air supply port 4 and the exhaust port 5.

Although the divided manifold blocks 11 are used in the fluid pressure device 1, in the above respective embodiments, the it is also possible to use a single manifold block to which the plurality of solenoid valves 10 can be mounted simultaneously. In this case, a plurality of sets of output ports 3A and 3B communicating with the respective solenoid valves 10 are formed in the manifold block.

Although each of the pipe joint assemblies 2A, 2B, and 2C includes all of the small-diameter pipe joints 6 for the output ports 3A, 3B, and the large-diameter pipe joints 7 or the sleeves 57 for the air supply ports 4 and the exhaust ports 5, the pipe joint assembly 2A may be formed of the large number of pipe joints 6 for the output port 3A and 3B without the pipe joints 7 for the air supply ports 4 and the exhaust ports 5. In this case, the large-diameter pipe joints 7 or sleeves 57 for the air supply ports 4 and the exhaust ports 5 are individually connected to the corresponding ports or used as an integrated member formed by putting the upper and lower two together by retaining them on a proper joint holder.

The fluid pressure device 1 is not limited to the above-described solenoid valve assembly and may be other devices having a plurality of ports. Only a row of ports may be provided instead of the plurality of rows of ports.

As described above, according to the invention, in connecting the pipes to the respective ports of the fluid pressure device having the plurality of ports, the connecting operation can be carried out easily by one operation and accurately without causing improper connection.

The invention claimed is:

1. A one-operation piping-installation fluid pressure apparatus comprising:
a fluid pressure device including a plurality of solenoid valves to which a plurality of ports is connected, the ports opening on one end face of the fluid pressure device and oriented in a row;
a pipe joint assembly including a plurality of pipe joints each having a port connecting portion capable of being connected to a respective port by insertion and a pipe connecting hole to which a respective pipe can be detachably connected, each of the pipe joints being retained by a joint holder having such a length as to be astride all the ports, each of the pipe joints being oriented in a row, and in the same arrangement as the ports of the fluid pressure device with the port connecting portions projecting from a back face of the holder and with the pipe connecting holes exposed on a front face of the holder; and
a fixing mechanism for fixing the pipe joint assembly to the fluid pressure device in a connected state,
wherein the fluid pressure device is a solenoid valve assembly including a plurality of divided manifold blocks each having a solenoid valve provided on an upper face of the manifold block and two side blocks disposed on opposite sides of a row of the manifold blocks, at least one of the two side blocks also functioning as an air supply/exhaust block,
each of the manifold blocks has two of the ports including upper and lower output ports communicating with the mounted solenoid valve on the upper face of the manifold block, the at least one air supply/exhaust block has an air supply port and an exhaust port communicating with each of the manifold blocks, said air supply/exhaust ports form parallel upper and lower ports in the solenoid valve assembly, and
the pipe joint assembly includes parallel rows of upper and lower pipe joints constituted of the plurality of pipe joints.

2. A fluid pressure apparatus according to claim 1, wherein each pipe joint has a cylindrical drum portion, the port connecting portion formed on a base end side of the drum portion, the pipe connecting hole formed on a tip end side of the drum portion, and a plate locking groove provided at an outer periphery of the drum portion and each joint holder has a retaining plate having one or more retaining holes in which the pipe joints are fitted and a plurality of fixing plates to be simultaneously engaged with the plate locking grooves of the plurality of pipe joints fitted in the retaining holes to fix the pipe joints.

3. A fluid pressure apparatus according to claim 2, wherein the retaining plate of the joint holder has two joint retaining holes in shapes of elongated holes parallel to each other, the plurality of pipe joints are housed in a row in each of the retaining holes, and the plurality of fixing plates are formed of a first fixing plate to be engaged with the plate locking grooves of the respective pipe joints positioned in one of the pipe joint rows, a second fixing plate to be engaged with the plate locking grooves of the respective pipe joints positioned in the other pipe joint row, and a third fixing plate to be simultaneously engaged with the plate locking grooves of the respective pipe joints positioned in both pipe joint rows between the two pipe joint rows.

4. A fluid pressure apparatus according to claim 3, wherein at least the first and second fixing plates have a plurality of recessed portions to be fitted with the respective pipe joints and are engaged with the plate locking grooves of the respective pipe joints at positions of the recessed portions.

5. A fluid pressure apparatus according to claim 2, wherein the two side blocks also function as the air supply/exhaust blocks respectively, distances between the air supply ports and the exhaust ports of the opposite side blocks are different from each other, and distances between pipe joints for air supply ports and pipe joints or sleeves for exhaust ports mounted to left and right opposite sides of the pipe joint assembly are different from each other.

6. A fluid pressure apparatus according to claim 1, wherein each pipe joint has a cylindrical drum portion, the port connecting portion formed on a base end side of the drum portion, the pipe connecting hole formed on a tip end side of the drum portion, and a plate locking groove provided at an outer periphery of the drum portion and each joint holder has a plurality of retaining plates each retaining the upper and lower pipe joints and disposed in a row, wherein the plurality of plates comprises a first fixing plate to be engaged with the plate locking grooves of the respective pipe joints positioned in the upper pipe joint row to fix the pipe joints, and a second fixing plate to be engaged with the plate locking grooves of the respective pipe joints positioned in the lower pipe joint row to fix the pipe joints.

7. A fluid pressure apparatus according to claim 6, wherein the first and second fixing plates have a plurality of recessed portions to be fitted with the respective pipe joints and are engaged with the plate locking grooves of the respective pipe joints at positions of the recessed portions.

8. A fluid pressure apparatus according to claim 6, wherein the two side blocks also function as the air supply/exhaust blocks respectively, distances between the air supply ports and the exhaust ports of the opposite side blocks are different from each other, and distances between the pipe joints for the air supply ports and the pipe joints or sleeves for the exhaust ports mounted to left and right opposite sides of the pipe joint assembly are different from each other.

9. A fluid pressure apparatus according to claim 1, wherein the two side blocks also function as the air supply/exhaust blocks respectively, distances between the air supply ports and the exhaust ports of the opposite side blocks are different from each other, and distances between pipe joints for air supply ports and pipe joints or sleeves for exhaust ports mounted to left and right opposite sides of the pipe joint assembly are different from each other.

10. A fluid pressure apparatus according to claim 1, wherein the fixing mechanism includes one or more pairs of clip insertion holes provided at positions corresponding to at least a part of the ports of the fluid pressure device to pass opposite end portions of one or more elastic clips in a diametrical direction of the ports, clip locking grooves provided at outer peripheries of the port connecting portions of the pipe joints, and the one or more elastic clips having first and second locking arms engaged with the clip locking grooves when inserted into the clip insertion holes.

11. A one-operation piping-installation fluid pressure apparatus comprising:
a fluid pressure device including a plurality of solenoid valves to which a plurality of ports is connected, the ports opening on one end face of the fluid pressure device and oriented in a row;
a pipe joint assembly including a plurality of pipe joints each having a port connecting portion capable of being connected to a respective port by insertion and a pipe connecting hole to which a respective pipe can be detachably connected, each of the pipe joints being retained by a joint holder having such a length as to be astride all the ports, each of the pipe joints being oriented in a row, and in the same arrangement as the ports of the fluid pressure device with the port connecting portions projecting from a back face of the holder and with the pipe connecting holes exposed on a front face of the holder; and
a fixing mechanism for fixing the pipe joint assembly to the fluid pressure device in a connected state,
wherein the fixing mechanism includes one or more pairs of clip insertion holes provided at positions corresponding to at least a part of the ports of the fluid pressure device to pass opposite end portions of one or more elastic clips in a diametrical direction of the ports, clip locking grooves provided at outer peripheries of the port connecting portions of the pipe joints, and the one or more elastic clips having first and second locking arms engaged with the clip locking grooves when inserted into the clip insertion holes,
wherein the fixing mechanism further has a rail-shaped clip holder for retaining the respective elastic clips such that each of the clips can move between a fixed position and an unfixed position and the clip holder can be attached to and detached from the fluid pressure device.

12. A fluid pressure apparatus according to claim 10, wherein the fixing mechanism further has a rail-shaped clip holder for retaining the respective elastic clips such that each of the clips can move between a fixed position and an unfixed position and the clip holder can be attached to and detached from the fluid pressure device.

13. A fluid pressure apparatus according to claim 12, wherein the clip holder has clip retaining holes into which the elastic clips can be movably inserted at positions corresponding to the respective elastic clips, each of the elastic clips has projections at positions close to tip end portions of the first and second locking arms, and the projections are locked to the clip holder when each of the elastic clips is moved to the unfixed position where a respective elastic clip is detached from a respective clip locking groove of the pipe joints so as to retain the elastic clip in the position.

14. A fluid pressure apparatus according to claim 10, wherein each of the elastic clips has a third locking arm extending parallel with the first and second locking arms and the third locking arm is formed to be engaged with a clip locking groove of a pipe joint adjacent to the pipe joint to which the first and second locking arms are locked.

15. A fluid pressure apparatus according to claim 11, wherein the clip holder has clip retaining holes into which the elastic clips can be movably inserted at positions corresponding to the respective elastic clips, each of the elastic clips has projections at positions close to tip end portions of the first and second locking arms, and the projections are locked to the clip holder when each of the elastic clips is moved to the unfixed position where a respective elastic clip is detached from a respective clip locking groove of the pipe joints so as to retain the elastic clip in the position.

16. A fluid pressure apparatus according to claim 11, wherein the clip holder has such a length as to be astride two side blocks and is mounted to the fluid pressure device by locking opposite ends of the clip holder to the two side blocks.

17. A fluid pressure apparatus according to claim 12, wherein the clip holder has such a length as to be astride the two side blocks and is mounted to the fluid pressure device by locking opposite ends of the clip holder to the side blocks.

18. A one-operation piping-installation fluid pressure apparatus comprising:
a fluid pressure device including a plurality of solenoid valves to which a plurality of ports is connected, the ports opening on one end face of the fluid pressure device and oriented in a row;
a pipe joint assembly including a plurality of pipe joints each having a port connecting portion capable of being connected to a respective port by insertion and a pipe connecting hole to which a respective pipe can be detachably connected, each of the pipe joints being retained by a joint holder having such a length as to be astride all the ports, each of the pipe joints being oriented in a row, and in the same arrangement as the ports of the fluid pressure device with the port connecting portions projecting from a back face of the holder and with the pipe connecting holes exposed on a front face of the holder; and
a fixing mechanism for fixing the pipe joint assembly to the fluid pressure device in a connected state,
wherein each pipe joint has a cylindrical drum portion, the port connecting portion formed on a base end side of the drum portion, the pipe connecting hole formed on a tip end side of the drum portion, and a plate locking groove provided at an outer periphery of the drum portion and each joint holder has a retaining plate having one or more retaining holes in which the pipe joints are fitted and a plurality of fixing plates to be simultaneously engaged with the plate locking grooves of the plurality of pipe joints fitted in the retaining holes to fix the pipe joints.

* * * * *